United States Patent
Hintermeister et al.

(10) Patent No.: US 11,226,845 B2
(45) Date of Patent: Jan. 18, 2022

(54) ENHANCED HEALING AND SCALABILITY OF CLOUD ENVIRONMENT APP INSTANCES THROUGH CONTINUOUS INSTANCE REGENERATION

(71) Applicant: International Business Machines Corporation, Armonk, NY (US)

(72) Inventors: Gregory R. Hintermeister, Rochester, MN (US); Sanjay Joshi, Raleigh, NC (US); Roland Barcia, Leonia, NJ (US)

(73) Assignee: International Business Machines Corporation, Armonk, NY (US)

(*) Notice: Subject to any disclaimer, the term of this patent is extended or adjusted under 35 U.S.C. 154(b) by 203 days.

(21) Appl. No.: 16/789,478

(22) Filed: Feb. 13, 2020

(65) Prior Publication Data

US 2021/0255901 A1   Aug. 19, 2021

(51) Int. Cl.
*G06F 9/46* (2006.01)
*G06F 9/50* (2006.01)
*G06F 9/445* (2018.01)

(52) U.S. Cl.
CPC ........ *G06F 9/5027* (2013.01); *G06F 9/44594* (2013.01); *G06F 9/466* (2013.01); *G06F 2209/5022* (2013.01)

(58) Field of Classification Search
CPC .... G06F 9/5022; G06F 9/44594; G06F 9/466; G06F 2209/5022
See application file for complete search history.

(56) References Cited

U.S. PATENT DOCUMENTS

| | | |
|---|---|---|
| 8,291,376 B2 | 10/2012 | Seitz |
| 8,751,627 B2 | 6/2014 | Liu |
| 2016/0182315 A1* | 6/2016 | Salokanto ........... H04L 41/5054 709/226 |
| 2017/0115978 A1* | 4/2017 | Modi ........................ G06F 8/65 |
| 2018/0034847 A1 | 2/2018 | Stella |
| 2018/0048522 A1 | 2/2018 | Pan |
| 2018/0176023 A1 | 6/2018 | Prickett |
| 2019/0095253 A1* | 3/2019 | Curtis ................. H04L 41/5058 |

OTHER PUBLICATIONS

"Can I repeatedly create & destroy random generator/distributor objects and destroy them (with a 'dice' class)?", Stack Overflow, asked Aug. 10, 2013 by Kluka, 5 pages, <https://stackoverflow.com/questions/18164800/can-i-repeatedly-create-destroy-random-generator-distributor-objects-and-destr>.

* cited by examiner

*Primary Examiner* — Diem K Cao
(74) *Attorney, Agent, or Firm* — Andrew Aubert

(57) ABSTRACT

Techniques for refreshing application instances periodically based on a refresh rate parameter, providing enhanced health and stability for instances actively executing workloads. When a workload is received requesting one or more application instance(s), a refresh rate is determined, and the instance(s) are monitored. Periodically, based on the refresh rate, the monitored application instance(s) are refreshed. One or more instance(s) are identified for refreshing, one or more new replacement instance(s) are generated, and the identified instances are removed from active service and decommissioned. Workloads continue execution upon the newly generated instances, which are in turn monitored and refreshed as dictated by the refresh rate.

18 Claims, 5 Drawing Sheets

ENHANCED HEALING AND SCALABILITY OF CLOUD ENVIRONMENT APP INSTANCES THROUGH CONTINUOUS INSTANCE REGENERATION

BACKGROUND

The present invention relates generally to the field of cloud computing application instances, and more particularly to cloud computing application instance healing and scalability.

Information technology frequently relies on conceptual models invoking the term 'layer' to describe different partitions of a computer system, the communications or functionality performed within a given partition, and communications between partitions. The present application relies on seven layers divided into two groupings. The first grouping, the media layers, include the following: (i) physical layer; (ii) data link layer; and (iii) network layer. The second grouping, the host layers, include the following: (i) transport layer; (ii) session layer; (iii) presentation layer; and (iv) application layer. The physical layer is used for the transmission and reception of raw bit streams over a physical medium. The data link layer is for the reliable transmission of data frames between two nodes connected by a physical layer. The network layer, which communicates via packets, is for structuring and managing a multi-node network, including addressing, routing and traffic control. The transport layer is for the reliable transmission of data segments between points on a network, including segmentation, acknowledgement and multiplexing. The session layer is for managing communication sessions, i.e. continuous exchange of information in the form of multiple back-and-forth transmissions between two nodes. The presentation layer is for the translation of data between a networking service and an application. This also includes character encoding, data compression and encryption/decryption. Finally, the application layer is where High-level APIs operate, including resource sharing, remote file access.

The network layer provides the procedural means and function of transferring variable length data sequences (sometimes referred to as packets) from one node to another node connected in "different networks". A network is defined as a medium to which many nodes can be connected to, on which every node has an address and nodes connected to it are permitted to transfer messages to other nodes which are connected to it by merely providing the content of a message and the address of the destination node and relying on the network to find the way to deliver the message to the destination node, potentially routing it via intermediate nodes. In contrast, the application layer describes shared communications protocols and interface methods utilized by hosts in a communications network.

Typical usage of cloud computing applications involves creating and operating instances of an application on computer hardware that may be distributed across multiple computer devices, with some computer devices located at different geographical locations that may be separated by great distances. The term scalability in this context means the capabilities relating to increasing and decreasing the number of instances of a given application based upon present or predicted demands. Healing refers to measures taken for correcting errors, bugs, or unintended operation of instances of an application.

SUMMARY

According to an aspect of the present invention, there is a method, computer program product and/or system that performs the following operations (not necessarily in the following order): (i) receiving a workload for execution by a plurality of instances of an application, with the workload including a rate of refresh parameter value; (ii) generating the plurality of instances of the application; and (iii) refreshing the generated plurality of instances periodically based, at least in part, on the rate of refresh parameter value, including: (a) selecting at least one instance of the generated plurality of instances, (b) generating at least one fresh replacement instance, and (c) decommissioning the selected at least one instance.

DETAILED DESCRIPTION

Figure 1:
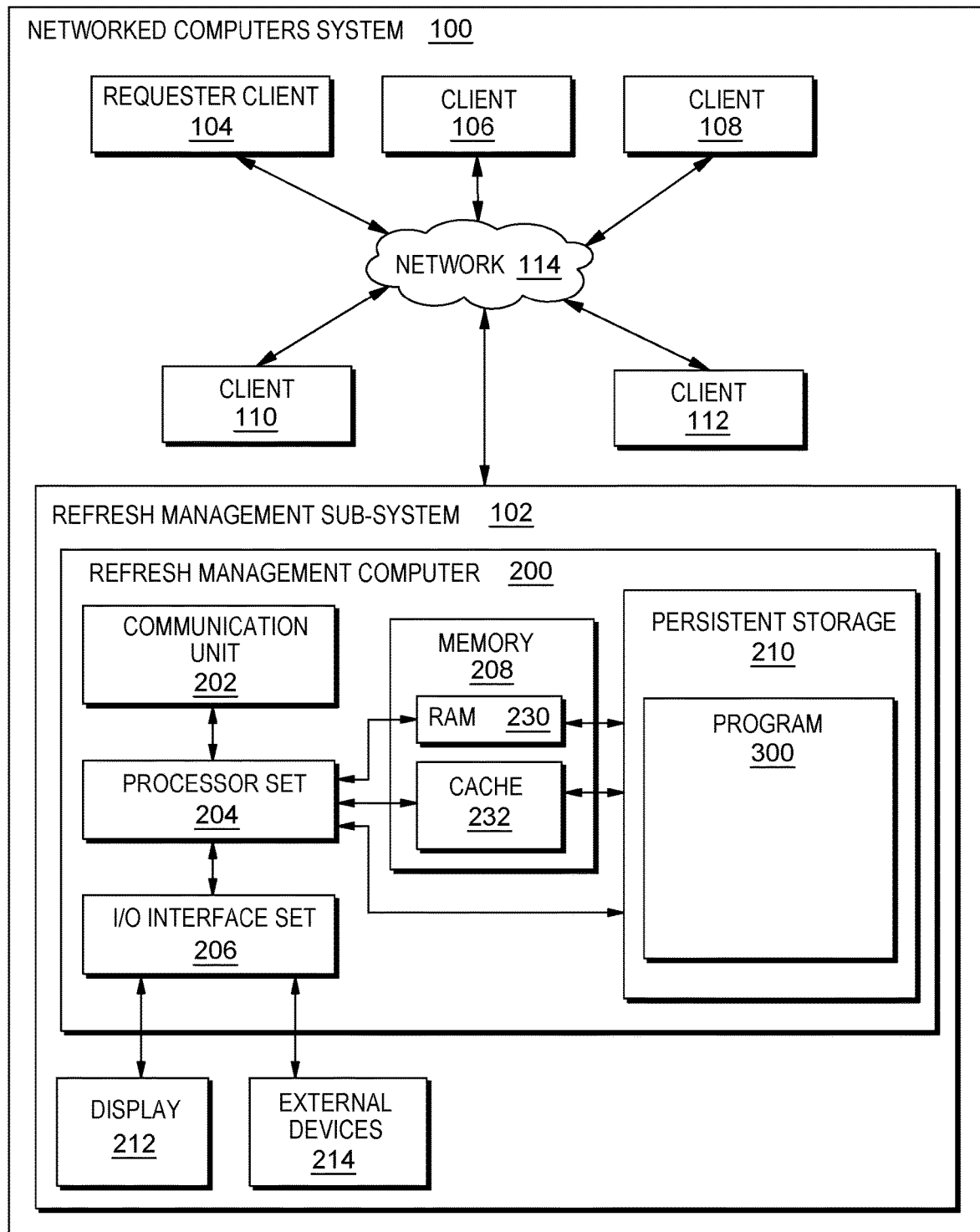
FIG. 1 is a block diagram view of a first embodiment of a system according to the present invention.

Some embodiments of the present invention are directed to techniques for refreshing application instances periodically based on a refresh rate parameter, providing enhanced health and stability for instances actively executing workloads. When a workload is received requesting one or more application instance(s), a refresh rate is determined, and the instance(s) are monitored. Periodically, based on the refresh rate, the monitored application instance(s) are refreshed. One or more instance(s) are identified for refreshing, one or more new replacement instance(s) are generated, and the identified instances are removed from active service and decommissioned. Workloads continue execution upon the newly generated instances, which are in turn monitored and refreshed as dictated by the refresh rate.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Described in detail with reference to the Figures. Networked computers system 100 includes: refresh management sub-system 102 (sometimes herein referred to, more simply, as sub-system 102); requester client 104; client sub-systems 106, 108, 110, 112; and communication network 114. Refresh management sub-system 102 includes: refresh management computer 200; communication unit 202; processor set 204; input/output (I/O) interface set 206; memory 208; persistent storage 210; display 212; external device(s) 214; random access memory (RAM) 230; cache 232; and program 300.

Sub-system 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Sub-system 102 is capable of communicating with other computer sub-systems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with refresh management computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
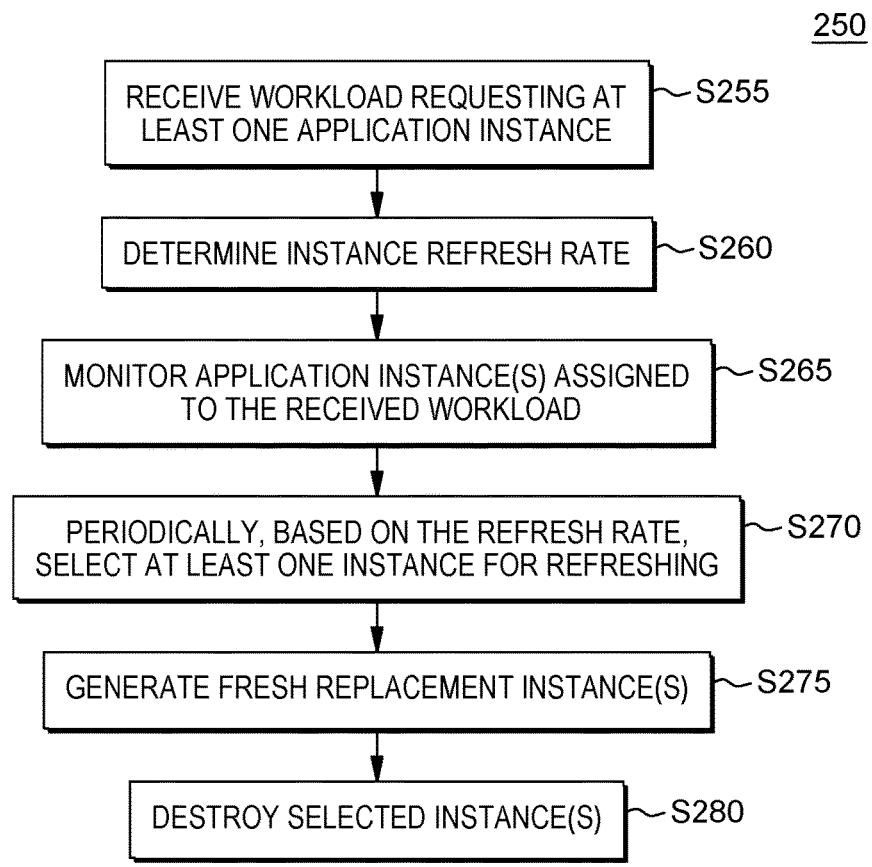
FIG. 2 is a flowchart showing a first embodiment method performed, at least in part, by the first embodiment system.
Figure 3:
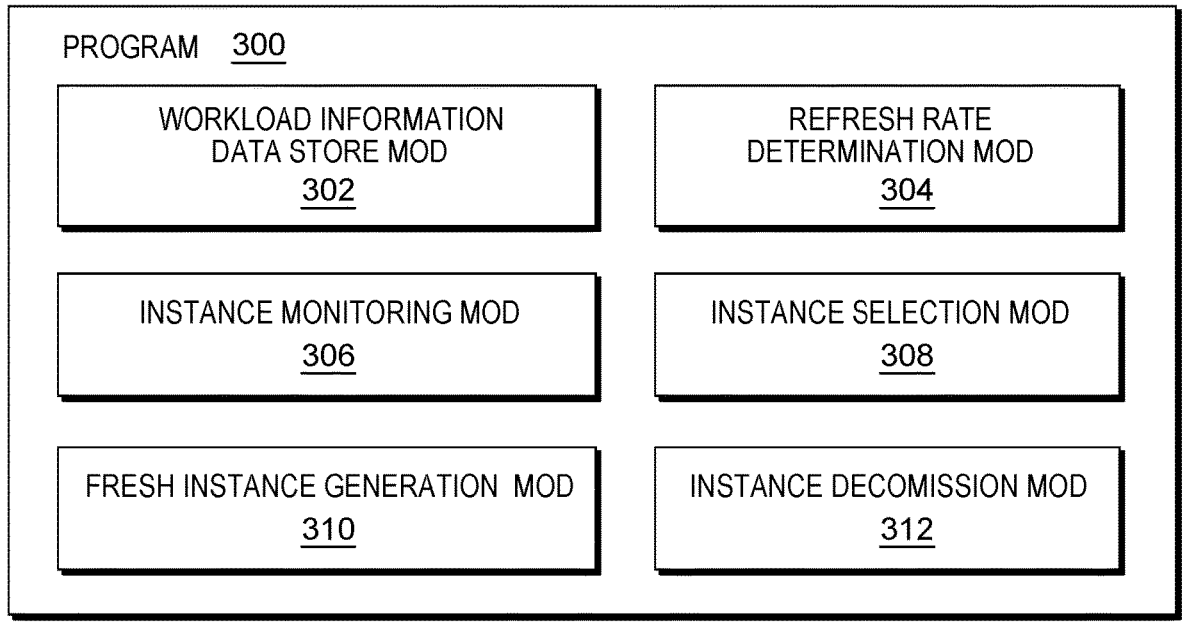
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3. In this simplified embodiment, program 300 is an example of a "renewal engine" module to be added to a cloud computing environment.

Processing begins at operation S255, where workload information data store module ("mod") 302 receives a workload requesting at least one application instance. In this simplified embodiment, the workload is received from requester client 104 and requests three instances of application A, an application for selecting clips from recent sporting events and presenting them to a client, and that workload request is stored in mod 302. Application A is a containerized application and both the workload and the instances of the application are within a cloud-based computing environment. Three instances of application A are created: (i) instance 1, (ii) instance 2, and (iii) instance 3. In alternative embodiments, metrics are included alongside the workload which are indicative of future demand, such as historical demand, current subscribers to the underlying service transmitting the workload, etc.

Figure 4:
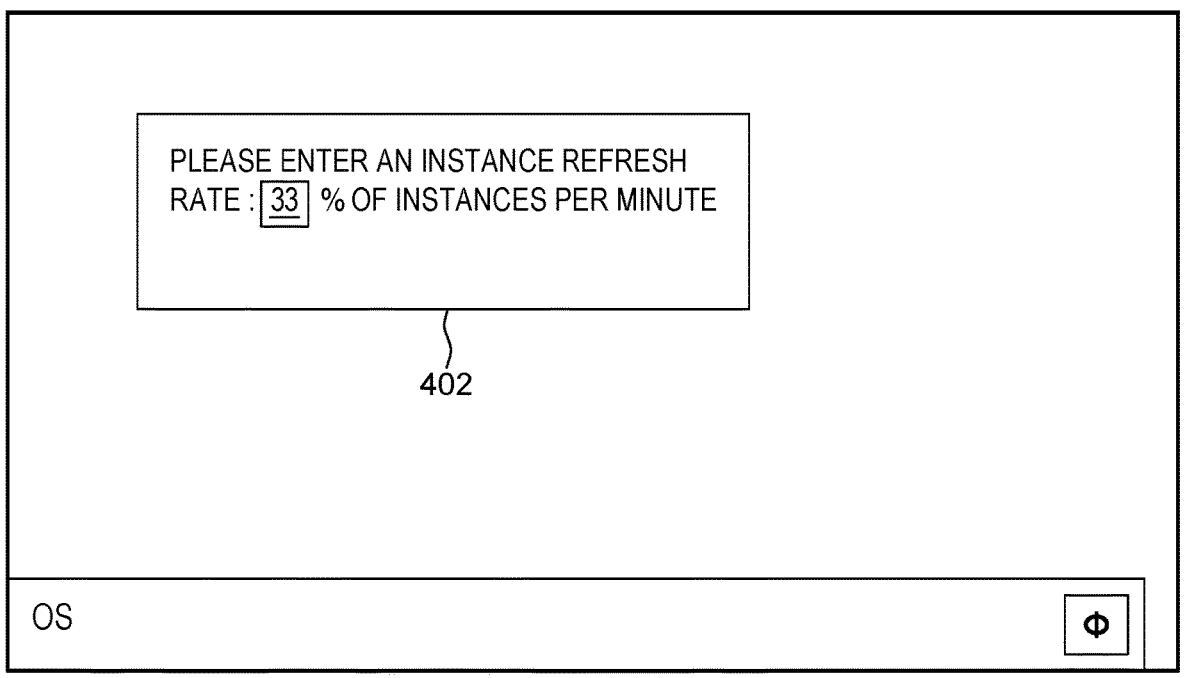
FIG. 4 is a screenshot view generated by the first embodiment system.

Processing proceeds to operation S260, where refresh rate determination mod 304 determines an instance refresh rate. In this simplified embodiment, the refresh rate is determined based upon a user-inputted value of 33 (shown in window 402 of user interface screenshot 400 of FIG. 4), which indicates that 33%, or one third of application instances assigned to a given workload must be refreshed every minute irrespective of other conditions. These are merely example numbers for the simplified embodiment. When put into practice, some embodiments based upon the simplified embodiment will adapt to suit the context. For example, some application instances may take some time (for example, several minutes) to become active after their initial creation. In this context, a refresh rate that outpaces an instance's ability to become active is impractical. Other numbers different than the examples used in the simplified embodiment may apply, such as twenty percent of instances refreshing every twelve minutes, or other numbers, or, some alternative embodiments may apply with different methods of setting refresh rates. Within this simplified embodiment, refreshing is the process of creating a new instance to replace another active instance and then subsequently decommissioning the instance being replaced while transitioning future work assignments to the new instance. When thirty three percent of instances must refresh each minute, one out of every three instances must refresh. For example, if there are three requested instances, then one of the instances must refresh each minute. If there are three hundred instances, then one hundred instances must refresh each minute. In this simplified embodiment, if the number of instances multiplied by the refresh rate does not yield a whole number, then the number of instances that must refresh is rounded up. For example, if the number of instances is ten, and the refresh rate is 33% per minute, 33% of ten is 3.33 and the number of instances that must refresh every minute is four. Mod 304 determines, based upon this determined refresh rate and the total number of instances, precisely how many instances must refresh during a given time window (in this embodiment, the time window is one minute). In an alternative embodiment, each individual instance is refreshed after being active for five minutes, or as frequently as necessary by other refresh criteria being triggered (for example, a certain number of bug reports generated from the instance prior to five minutes having elapsed from the instance becoming active.

In alternative embodiments, the number of instances is rounded down. In further alternative embodiments, a determination is made on whether to round up or round down based upon the importance of the workload. If other conditions or criteria are present that require more or all of the instances to be refreshed within a shorter window of time, then those refreshes occur outside of the refresh rate, with refreshes continuing to occur based upon the refresh rate. In alternative embodiments, other refresh rates may be used (for example: (i) one percent per second, (ii) ten percent per second, (iii) ten percent per six seconds, (iv) twenty five percent per fifteen minutes, (v) one percent per minute, (vi) one instance per second, etc.) In further alternative embodiments, the refresh rate is determined by other means, including: (i) bug reports indicating how long after instance creation that bugs or errors begin to manifest, (ii) the data size of a given instance in bytes, (iii) how many instances are requested for the workload relative to a typical instance quantity request, (iv) criticality or importance of a workload, (v) frequency of cyberattacks on instances of the application, (vi) reported vulnerabilities associated with instances of the application, (vii) rate of error reports in logs for a given instance; (viii) type of cloud instance application (such as private, public, or hybrid cloud); (ix) geographic location of hardware hosting the cloud application instance, etc.).

Processing proceeds to operation S265, where instance monitoring mod 306 monitors application instance(s) assigned to the received workload. In this simplified embodiment, mod 306 monitors the three active instances of application A that are processing requests from clients 106, 108 and 110 of FIG. 1. These requests are received by sub-system 102 through network 114. Mod 306 monitors the active instances for certain criteria. In this simplified embodiment, the 'certain criteria' is how long ago the instance was created. The monitored application instance(s) are executing the received workload while being monitored. In alternative embodiments other criteria are monitored, for example: (i) how many bugs or errors are reported from each instance, (ii) how many times each instance has been subject to an attempted cyberattack intrusion, etc.

Processing proceeds to operation S270, where instance selection mod 308 periodically, based on the refresh rate, selects at least one instance for refreshing. In this simplified embodiment, mod 308 selects whichever instance is oldest. This may alternatively discussed as the age of an instance, where an age is a value in seconds since the instance was generated. As each of the three current instances were created as part of the initial requisition of instances and were created at the same time, instance 1 is selected for refreshing. In alternative embodiments, an instance may be selected using secondary criteria, such as: (i) percentage of work completed, (ii) demand and available bandwidth upon the computer hosting a given instance, (iii) latency to client interaction, etc.

Processing proceeds to operation S275, where fresh instance generation mod 310 generates fresh replacement instance(s). In this simplified embodiment, an identical instance to the first instance is created by fresh instance generation mod 310 to function as a replacement instance, including all of the relevant data to process requests or transactions for application A. This instance is instance 4. In alternative embodiments, the replacement instance might feature software updates to software within the instance, making the software within the replacement instance more up-to-date than the software of the instance it is replacing. Momentarily, four instances exist: the initial three instances as well as the fourth replacement instance.

Processing proceeds to operation S280, where instance decommission mod 312 decommissions the selected instance(s). In this simplified embodiment, instance decommission mod 312 decommissions instance 1 by flagging it to no longer receive future requests and, responsive to an absence in processing any current transactions, decommissions the instance on sub-system 102. A subsequent transaction for application A, from client 112 of FIG. 1, for example, will be processed by instance 2, instance 3, or instance 4, until one or more of those instances are refreshed.

The flowchart present in FIG. 2 describes a single "flow" through the simplified example embodiment method, to aid understanding how each step is connected to the next. When put into practice, completion of S280 would then return to operation S265 to continue monitoring application instance(s) assigned to the received workload (and the subsequent operations) until the workload is concluded and active application instances are no longer required by the workload.

In alternative embodiments, each instance of an application, such as application A, invoke one or more sub-instances of other applications or services necessary to complete a transaction request from a client. In these alternative embodiments, the sub-instances are independently monitored and refreshed, with the sub-instances inherited by the replacement to the parent instance. In other alternative embodiments, each time a parent instance is refreshed, the sub-instances are also refreshed, in addition to their own individual refresh events.

III. Further Comments and/or Embodiments

Some embodiments of the present invention recognize the following facts, potential problems and/or potential areas for improvement with respect to the current state of the art: (i) many modern cloud environments today have the ability to automatically scale application instances as demand increases and decreases; (ii) such cloud environments even include "liveness checks" so that if an instance is having problems, the cloud environment kills the instance and creates another; (iii) a major flaw exists where, in a fairly constant demand scenario, which happens more often than not, a given instance will be replaced only when it's response time extends for long periods of time; (iv) even when applications do automatically scale, it takes time for the first new instance to become active, potentially overwhelming existing instances; (v) frequently, when scaling down, the "newer instances" are the instances that are removed once demand decreases—leaving open vulnerabilities to magnify and hacking window to increase; (vi) one problem is that software is inherently imperfect, and as software runs, those imperfections magnify to become even more significant problems; (vii) while a liveness check may address some of the issues that arise, the end result of a liveness check is still an end user facing a timeout issue or glitchy experience; (viii) additionally, the longer an instance runs, the more likely it can become a target of hacking; and (ix) existing art waits for a trigger before responding (by scaling up, down, repairing an instance, etc.), whereas nature constantly renews itself before triggers even appear.

Some embodiments of the present invention may include one, or more, of the following operations, features, characteristics and/or advantages: (i) constantly renewing app instances (mimicking nature) to keep inevitable imperfections from impacting users can help alleviate some of these issues; (ii) overcoming the inertia of software trigger-based schedulers, and even 'cognitive' schedulers trying to anticipate when problems will occur; (iii) continually destroying and/or creating workload instances resulting in faster healing and/or growth; (iv) by adding a "Renewal Engine" to a cloud environment, applications gain: (a) augmented health, (b) scalability improves, (c) security and hacking targeting windows are reduced, and (d) users receive a better experience simply by preventing imperfections to amplify over time into detectable problems; (iv) when a workload is deployed, the workload registers to a renewal engine with parameters such as: (a) rate of renewal, (b) renewal criteria (for example, bug reports indicating how long after instance creation that bugs or errors begin to manifest, how many instances are required to concurrently exist for the workload to thrive, an expiration date/length of life maximum, whether there is a new base image available to create new instances from, etc.), and more; (v) the Renewal Engine then monitors the workload instances and begins renewing; (vi) part of this monitoring activity includes tracking active "auto-scaling" policies applied to the workload so that the Renewal Engine knows how many active instances should be receiving transactions, based on demand; (vii) as a result, even with the constant destruction and/or creation of app instances, there are always an optimum number of instances ready to do work, based on demand; (viii) in cases where the auto-scaling policy needs to increase the number of instances, the auto-scaling policy can alter the Renewal Engine to halt destroying instances temporarily while instance creation continues to run continuously; (ix) this results in scaling to the proper number of instances far more quickly; (ix) once the desired number of instances is reached or has crossed a predetermined threshold, the Renewal Engine resumes destroying instances as part of the continuous renewal cycle; and (x) in some embodiments the Renewal Engine: (a) selects the oldest instance, (b) creates a replacement instance for the old instance, (c) makes the old instance inactive, (d) destroys it, and (e) then repeats.

Figure 5:
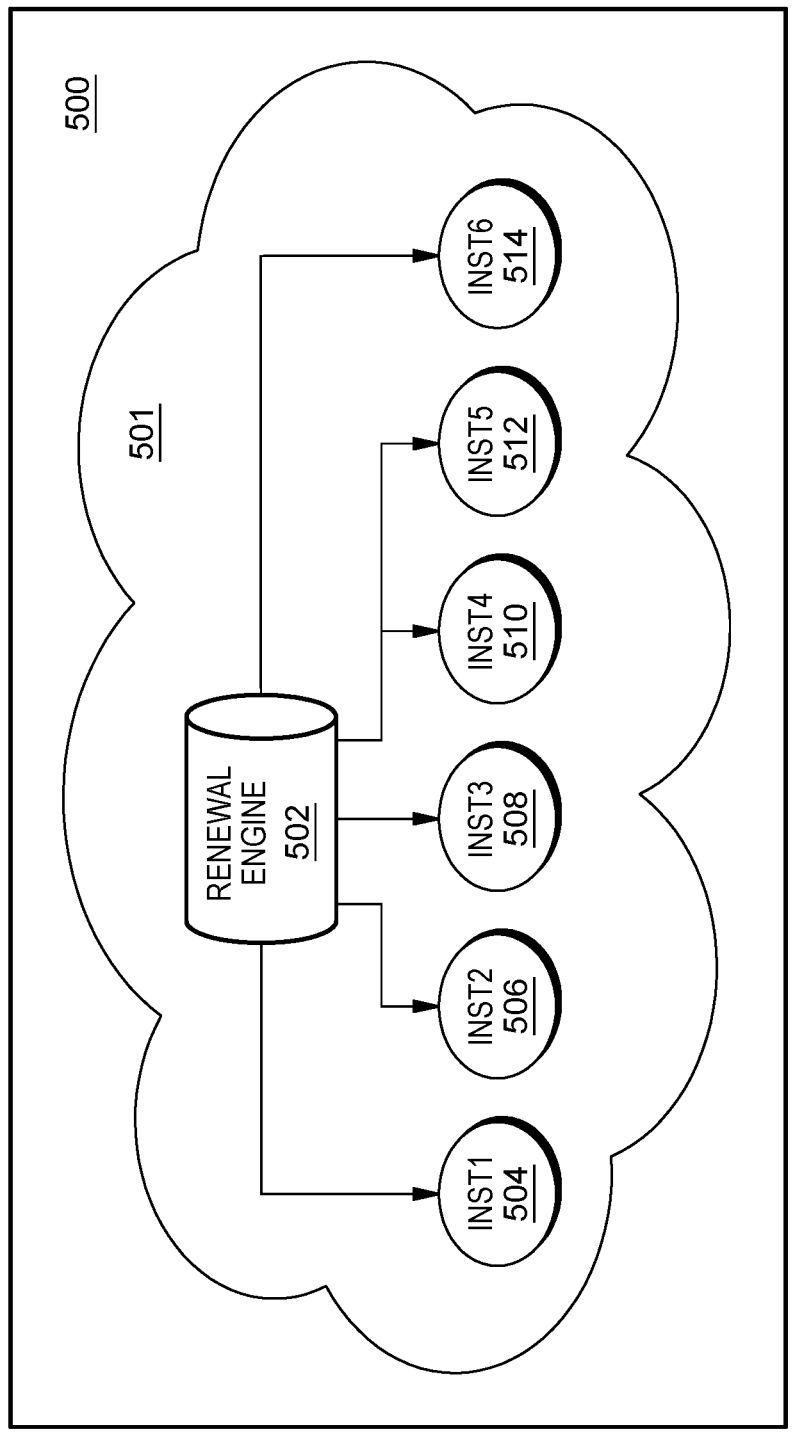
FIG. 5 is a block diagram view of a second embodiment of a system according to the present invention.

An example alternative embodiment will now be discussed with respect to cloud environment 500 of FIG. 5. Cloud environment 500 includes: (i) cloud 501; (ii) renewal engine 502; (iii) and instances 504, 506, 508, 510, 512 and 514. In this alternative embodiment, renewal engine 502 maintains a quota of five active instances, initially instances 504 through 512. Periodically, and based on renewal criteria, the instances are refreshed. In this example, the oldest active instance, instance 504, is flagged for refreshing. Replacement instance 514 is generated to replace instance 504, and instance 504 is deleted, maintaining the quota of five active instances while also refreshing instances that have passed a predetermined expiration date.

An example method for renewing workloads registered to the Renewal Engine according to some embodiments of the present invention includes the following operations, not necessarily in the following order: (i) monitoring the number of active instances to ensure it does not reduce the number of active instances; (ii) identifying/selecting the instance to destroy, based on renewal criteria (by default it picks the oldest instance—the one that has been running the longest); (iii) creating a replacement instance, knowing it may take several seconds for the replacement to become ready; (iv) once the replacement instance signals that it is ready, the Renewal Engine taints the identified/selected instance to destroy it so that it receives no new transaction requests; (v) monitoring the identified/selected instance until any active transactions are completed; (vi) destroying the identified/selected instance; and (vii) once the instance is fully destroyed, the method starts over.

Some embodiments of the present invention may include one, or more, of the following operations, features, characteristics and/or advantages: (i) referring to the example method above, while this example method shows a simple app with multiple instances, the example method also applies to workloads with many individual microservices, each with multiple instances of the many individual microservices; (ii) for example, a workload for a stock trading app may have 5 microservices with several instances, and each microservice instance requires constant renewal; (iii) the Renewal Engine can simultaneously monitor each microservice and the instances of the microservice to ensure the renewal rate is matching a requested policy; (iv) auto Scaling Details Based on the engine behavior above, it can become simple for an auto-scaling policy to alter either end of the Renewal Engine to match the scalability needs far faster than previously; (v) if the scaling policy says to increase the number of instances, it pauses the destroy flow; (vi) as a result, the engine is always running at peak efficiency, the policy only needs to pause the part of the engine that it doesn't need right now; (vii) Recursive Renewal relates to situations where some workloads contain multiple parts (for example, HA workloads may contain 10 microservices across 2 availability zones, with deployed dedicated services for its database, where the database also has multiple instances to enable higher availability); (viii) in these cases, the Renewal Engine follows a recursive approach where the workload registered to the Renewal Engine may have 5 instances that need constant renewal, yet instance 1 also contains multiple sub-workloads that also each require constant renewal; (ix) for this approach, the Renewal Engine spawns a copy of itself to handle these sub-workloads knowing that it is merely keeping that workload instance alive for a period of time, though in reality the timespan will be longer because of the complexity of the workload; and (x) this recursive approach ensures that every element is renewed at a rate desired by the deployer or through best practices/cognitive learning.

Figure 6:
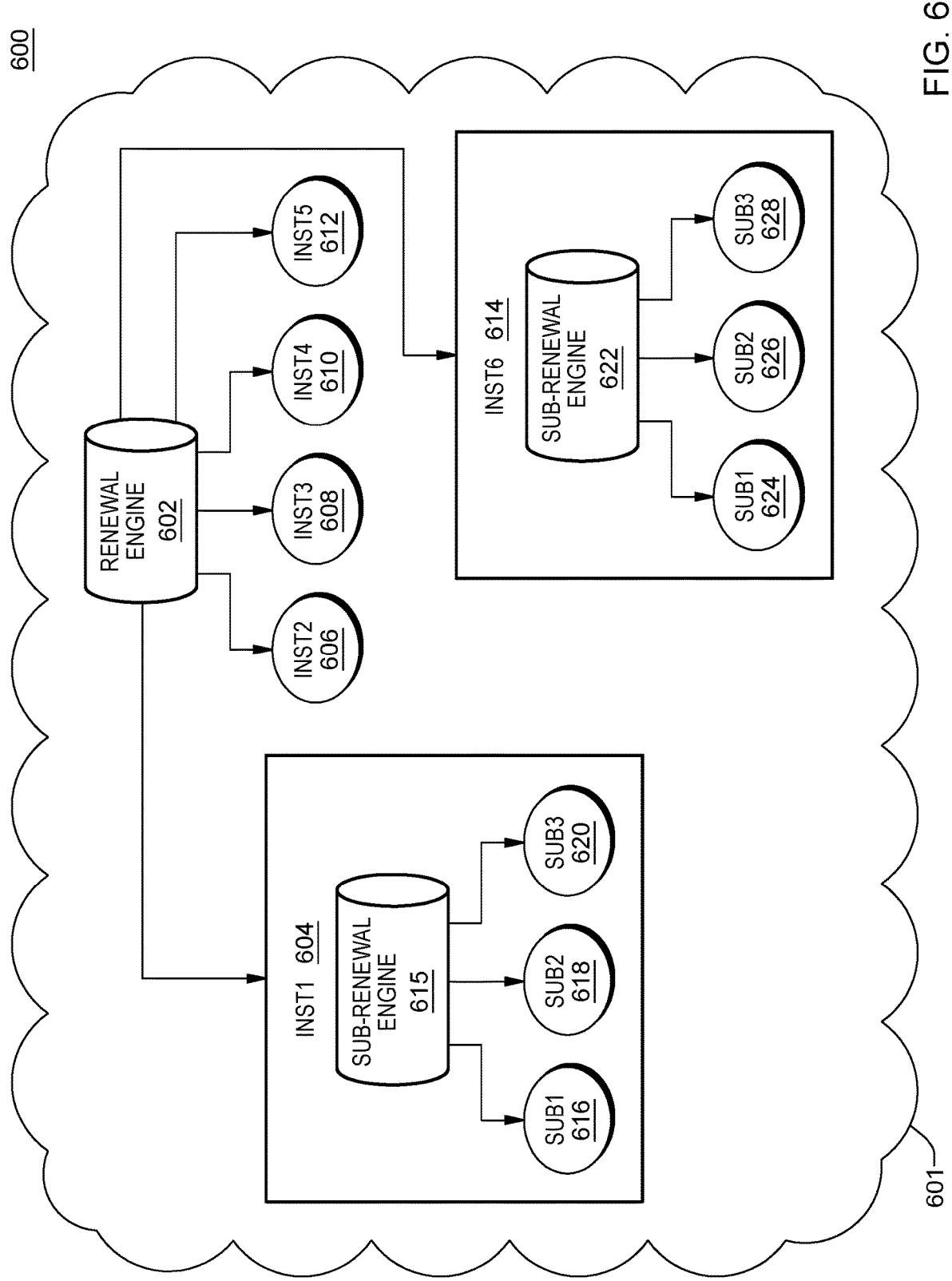
FIG. 6 is a block diagram view of a third embodiment of a system according to the present invention.

Another example alternative embodiment will now be discussed with respect to cloud environment 600 of FIG. 6. Cloud environment 600 includes: (i) cloud 601; (ii) renewal engine 602; (iii) instances 604, 606, 608, 610, 612 and 614; (iv) instance 604 further includes: (a) sub-renewal engine 615, (b) sub-instance 616, (c) sub-instance 618, and (d) sub-instance 620; and (v) instance 614 further includes: (a) sub-renewal engine 622, (b) sub-instance 624, (c) sub-instance 626, and (d) sub-instance 628. In this alternative embodiment, cloud 601 maintains five active instances (604 through 612) according to a predetermined quota, live-demand, etc. Additionally, instance 604 also includes two sub-instances, 616 and 618. Because instance 604 includes sub-instances, renewal engine 602 generates and assigns sub-renewal engine 615 to refresh the sub-instances of instance 604. A refresh of the sub-instances, in this alternative embodiment, includes selecting sub-instance 616 to be refreshed, generating a new sub-instance 620, and destroying sub-instance 616. Refreshing the instances includes selecting instance 604 for refreshing, generating a new instance 614, including sub-instances 624 and 626, destroying instance 604, including sub-instances 616, 618 and 620, and subsequently generating a sub-renewal engine 622 and assigning it to refresh the sub-instances of instance 614. Refreshing the sub-instances of instance 614 includes flagging sub-instance 624 for refreshing, generating a new sub-instance 628, and destroying sub-instance 624.

Some embodiments of the present invention may include one, or more, of the following operations, features, characteristics and/or advantages: (i) constant renewal approach that compliments existing methods of creation/deletion such as auto-scale policies; (ii) interact with an application instance's "liveness and readiness" so that the application instance ends gracefully; (iii) recursive renewal is essential in a complex application environment like modern clouds; (iv) works with running applications in a cloud environment; (v) continuous renewal of multiple instances in a microservices architecture and helps with that renewal even in complex environments through recursive renewal capabilities; (vi) operates in runtimes; (vii) a Renewal engine that continually creates/destroys instances at a constant pace, maintaining the requested number of instances "ready" for work; (viii) the renewal engine integrates with existing auto-scale policies to heighten speed of scale up/down; (ix) a recursive renewal which recognizes that workload components frequently comprise many micro-services themselves as sub-components so that a renewal engine needs to recursively renew components by managing sub-component renewal in order for the main component renewal to be managed appropriately; (x) focused on the Application layer; (xi) with modern cloud environments, an application instance typically runs in a container (for example, Kubernetes pods, virtual machines, Cloud foundry containers, etc.), and some embodiments focus on continuously renewing those instances.

An example method for renewing workloads registered to the Renewal Engine, according to some embodiments of the present invention, includes the following: a method of continually creating, destroying and re-creating instances of an application so that imperfections in the application do not get amplified and cause detriment to users. The above method, wherein the instances of an application are used to perform a workload in a cloud computing environment.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers and, application-specific integrated circuit (ASIC) based devices.

What is claimed is:

1. A computer-implemented method comprising:
receiving a workload for execution by a plurality of instances of an application, with the workload including a rate of refresh parameter value;
generating the plurality of instances of the application; and
refreshing the generated plurality of instances periodically based, at least in part, on the rate of refresh parameter value, including:
selecting at least one instance of the generated plurality of instances,
generating at least one fresh replacement instance, and
decommissioning the selected at least one instance.

2. The computer-implemented method of claim 1, wherein the plurality of instances of an application are used to execute a workload in a cloud computing environment.

3. The computer-implemented method of claim 1, wherein the selected at least one instance is selected based upon an age of the selected instance, where an age is a value in seconds since the selected instance was generated.

4. The computer-implemented method of claim 1, further comprising:
executing transactions for the workload on the plurality of instances.

5. The computer-implemented method of claim 1, further comprising:
executing a new transaction for the workload on the at least one fresh replacement instance.

6. The computer-implemented method of claim 1, wherein:
each given instance of the application includes one or more sub-instance(s) which supports the given instance of the application; and
each sub-instance is periodically refreshed independently of the given instance of the application according to a separate rate of refresh parameter value.

7. A computer program product comprising:
a machine readable storage device; and
computer code stored on the machine readable storage device, with the computer code including instructions for causing a processor(s) set to perform operations including the following:
receiving a workload for execution by a plurality of instances of an application, with the workload including a rate of refresh parameter value,
generating the plurality of instances of the application, and
refreshing the generated plurality of instances periodically based, at least in part, on the rate of refresh parameter value, including:
selecting at least one instance of the generated plurality of instances,
generating at least one fresh replacement instance, and
decommissioning the selected at least one instance.

8. The computer program product of claim 7, wherein the plurality of instances of an application are used to execute a workload in a cloud computing environment.

9. The computer program product of claim 7, wherein the selected at least one instance is selected based upon an age of the selected instance, where an age is a value in seconds since the selected instance was generated.

10. The computer program product of claim 7, wherein the computer code further includes instructions for causing the processor(s) set to perform the following operations:
executing transactions for the workload on the plurality of instances.

11. The computer program product of claim 7, wherein the computer code further includes instructions for causing the processor(s) set to perform the following operations:
executing a new transaction for the workload on the at least one fresh replacement instance.

12. The computer program product of claim 7, wherein:
each given instance of the application includes one or more sub-instance(s) which supports the given instance of the application; and
each sub-instance is periodically refreshed independently of the given instance of the application according to a separate rate of refresh parameter value.

13. A computer system comprising:
a processor(s) set;
a machine readable storage device; and
computer code stored on the machine readable storage device, with the computer code including instructions for causing the processor(s) set to perform operations including the following:
receiving a workload for execution by a plurality of instances of an application, with the workload including a rate of refresh parameter value,
generating the plurality of instances of the application, and
refreshing the generated plurality of instances periodically based, at least in part, on the rate of refresh parameter value, including:
selecting at least one instance of the generated plurality of instances,
generating at least one fresh replacement instance, and
decommissioning the selected at least one instance.

14. The computer system of claim 13, wherein the plurality of instances of an application are used to execute a workload in a cloud computing environment.

15. The computer system of claim 13, wherein the selected at least one instance is selected based upon an age of the selected instance, where an age is a value in seconds since the selected instance was generated.

16. The computer system of claim 13, wherein the computer code further includes instructions for causing the processor(s) set to perform the following operations:
executing transactions for the workload on the plurality of instances.

17. The computer system of claim 13, wherein the computer code further includes instructions for causing the processor(s) set to perform the following operations:
executing a new transaction for the workload on the at least one fresh replacement instance.

18. The computer system of claim 13, wherein:
each given instance of the application includes one or more sub-instance(s) which supports the given instance of the application; and
each sub-instance is periodically refreshed independently of the given instance of the application according to a separate rate of refresh parameter value.

* * * * *